United States Patent [19]

Costantini

[11] 4,039,621

[45] Aug. 2, 1977

[54] POWER GENERATION WHEREIN SULFUR AND NITROGEN OXIDES ARE REMOVED

[75] Inventor: Ralph Costantini, Los Angeles, Calif.

[73] Assignee: Ralph M. Parsons Company, Pasadena, Calif.

[21] Appl. No.: 454,124

[22] Filed: Mar. 25, 1974

[51] Int. Cl.² .................... B01J 8/00; C01B 21/00; C01B 17/00

[52] U.S. Cl. .................... 423/239; 423/244; 423/564; 423/573 G; 431/4; 122/4 D

[58] Field of Search .................... 423/242–244, 423/352, 359, 360, 351, 239, 573; 431/4, 10; 110/1 J, 1 K, 416, 563; 122/4 D, 564

[56] References Cited

U.S. PATENT DOCUMENTS

| 3,418,258 | 12/1968 | Ackermann | 423/244 |
|---|---|---|---|
| 3,454,355 | 7/1969 | Ryason | 423/239 |
| 3,752,877 | 8/1973 | Beavon | 423/244 |
| 3,755,550 | 8/1973 | Stiles | 423/244 |
| 3,794,710 | 2/1974 | Merrill | 423/244 |
| 3,838,193 | 9/1974 | Kajitani et al. | 423/351 |

FOREIGN PATENT DOCUMENTS

| 643,807 | 6/1962 | Canada | 423/564 |

Primary Examiner—O. R. Vertiz
Assistant Examiner—Gregory A. Heller
Attorney, Agent, or Firm—Christie, Parker & Hale

[57] ABSTRACT

A sulfur bearing carbonaceous fuel, particularly a low BTU gaseous fuel, is burned in a deficiency of air in the combustion zone of a boiler to form a reducing gas containing $H_2$ and CO in an amount in excess of that required to reduce the generated $SO_x$ to $H_2S$ and COS. The oxides of sulfur and nitrogen are, in part, converted to $H_2S$, $N_2$ and/or $NH_3$ during heat transfer in the boiler. The balance is passed through a catalyst chamber where sulfur species are converted to $H_2S$ and oxides of nitrogen to $N_2$ and/or $NH_3$. The formed $H_2S$ is extracted from the flue gas prior to venting to the atmosphere and recovered as free sulfur. Catalytic conversion is carried out at a temperature from about 300° to 800° F.

6 Claims, 1 Drawing Figure

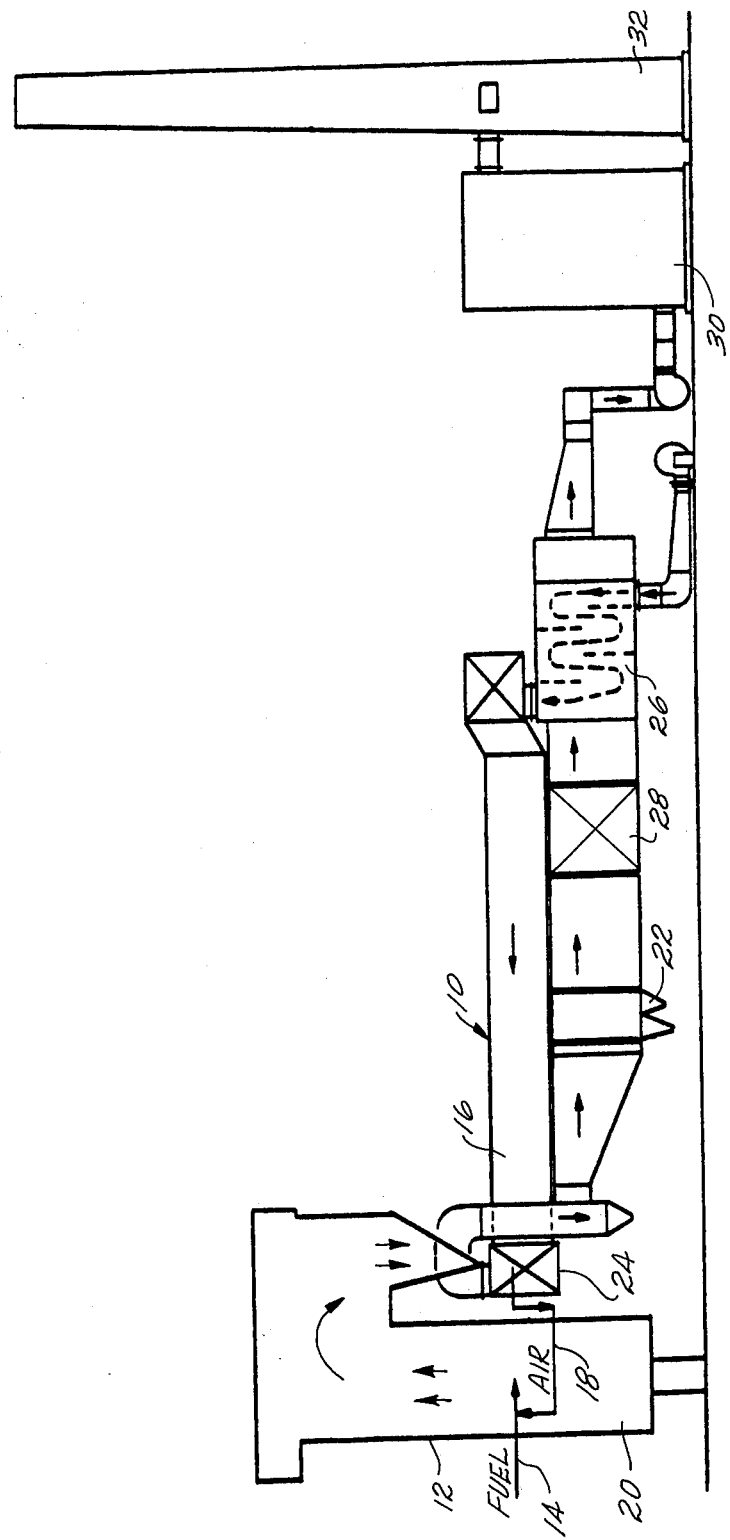

POWER GENERATION WHEREIN SULFUR AND NITROGEN OXIDES ARE REMOVED

BACKGROUND OF THE INVENTION

For a few years and in the interest of the ecology, low sulfur fossil fuels were used in the generation of energy by the combustion of low sulfur coal and similar low sulfur carbonaceous materials.

Depleting fuel reserves, however, have dictated the necessity of combusting fossil fuels of high sulfur content.

With this, considerable interest has developed in the ability to combust high sulfur fuels and still emit a flue gas to the atmosphere which is sufficiently low in the oxides of sulfur that a problem will not be presented from an ecology standpoint.

Many processes have been proposed for the removal of the oxides of sulfur from the stack gases emitting from the boiler sections of power generation systems.

Most are complicated and involve additional operating and maintenance expense in addition to high initial capital cost for new installations. They are also cumbersome and costly to adapt to existing installations.

Some involve rejection scrubbing operations, which entail additional raw materials and material handling cost, add nothing to fuel efficiency, rather decrease it, and result in slurry disposal problem.

In another process, sulfur dioxide is scrubbed from the gas and regenerated as sulfur dioxide. Operating costs are high and the oxides of nitrogen introduce complications to sulfur dioxide removal. Further, sulfur dioxide is not a desirable by-product and must be converted to sulfuric acid or to sulfur at a considerable additional expense.

SUMMARY OF THE INVENTION

According to the present invention, there is provided a process for the elimination of sulfur emissions to the atmosphere in the operation of power generators based on the combustion of the sulfur bearing carbonaceous fuels, such as power plant boilers and the like while conserving or increasing plant efficiency.

In accordance with the present invention, the fuel to air ratio is adjusted so that the products of the combustion zone of a boiler, while containing oxides of sulfur and nitrogen, will contain sufficient hydrogen and carbon monoxide to reduce the oxides of sulfur to hydrogen sulfide and carbonyl sulfide and the oxides of nitrogen to inert nitrogen and/or ammonia. A portion of reduction occurs during heat transfer in the boiler and the balance catalytically at a temperature from about 300° to about 800° F in the presence of a catalyst capable of converting the oxides of sulfur to hydrogen sulfide and the oxides of nitrogen to inert nitrogen, ammonia or mixtures thereof. The catalyst may also hydrolyze formed carbon-sulfur compounds to hydrogen sulfide. Following reduction of the oxides of sulfur to hydrogen sulfide and the oxides of nitrogen to inert nitrogen and ammonia, the flue gas stream is passed through an extraction zone where the formed hydrogen sulfide is extracted prior to venting the flue gas to the atmosphere.

In carrying out the process of the invention, it is preferred that the amount of hydrogen and carbon monoxide formed during the combustion of the carbonaceous fuel is preferably about 30 to 60 % in excess of the stoichiometric amount required to reduce the sulfur present as sulfur dioxide to hydrogen sulfide and carbonyl sulfide. This insures complete consumption of the oxygen present in the air fed to the combustion zone and provides the driving force for both the non-catalytic and catalytic reduction of the oxides of sulfur and nitrogen to hydrogen sulfide and inert nitrogen and ammonia.

In particular, in the practice of the process of the invention the sulfur bearing carbonaceous fuel is combusted in a deficiency of air in a combustion zone of a boiler of power generation apparatus to form a high temperature flue gas stream which comprises the oxides of carbon, including carbon monoxide; oxides of sulfur; oxides of nitrogen; hydrogen and water. The gas stream is then passed through the heat extraction sections of the boiler where energy is generated in the form of useful steam and the like, while temperature reduced. At least the oxides of sulfur react with hydrogen and the carbon monoxide present to form hydrogen sulfide and carbonyl sulfide. When the gas stream is cooled to a temperature of from about 350° to about 800° F, preferably from about 500° to about 800° F, the gas stream is passed through a catalytic conversion zone where residual oxides of sulfur are converted to hydrogen sulfide and the oxides of nitrogen to inert nitrogen and/or ammonia. As water is present or formed, carbonyl sulfide present will also be catalytically hydrolyzed to hydrogen sulfide. The formed hydrogen sulfide is then extracted from the flue gas stream prior to venting the flue gas stream to the atmosphere.

In carrying out the process of this invention, the flue gas stream ultimately discharged to the atmosphere will contain minimal quantities of the oxides of nitrogen and oxides of sulfur below a 100 ppm level to meet or exceed the most stringent regulations for emissions of the oxides of sulfur to the atmosphere.

In addition to permitting utilization of conventional high sulfur fuels for power generation a particular advantage of the process of this invention is a generation of energy from low BTU gaseous hydrocarbon fuels such as those obtained by the gasification of coal.

Further, because the resultant final volume of flue gas generated, when measured as standard conditions, per unit of power generated will normally be 15 to 20% less than employed in the conventional practice where fuel is combusted in the presence of 15% or more excess air. This permits a significant reduction in equipment size and, therefore, capital cost of equipment used for power generation.

THE DRAWING

The drawing illustrates one scheme for carrying out the process of this invention.

DESCRIPTION

According to the present invention, there is provided an improved process for the generation of power from sulfur bearing carbonaceous fuels while at the same time eliminating the oxides of sulfur and nitrogen from the resultant stack or flue gases.

In its more salient aspect, process of this invention comprises increasing the overall ratio of fuel to the air supplied to the combustion zone of a boiler to the extent that reducing conditions will prevail in the flue gas at the discharge of the combustion zone. The reducing conditions result from the use of a deficiency of air. In particular, the amount of air fed to the combustion zone is sufficiently low such that the effluent from the combustion zone will contain an excess hydrogen and carbon monoxide over that required for the reduction of the formed oxides of sulfur to hydrogen sulfide and carbonyl sulfide, preferably from about 'to 60% in excess of the stoichiometric requirement. This insures that the effluent from the combustion zone will be oxygen free and contain sufficient excess hydrogen and carbon monoxide for the reduction of the oxides of sulfur, predominantly sulfur dioxide in accordance with the following reactions.

$$SO_2 + 3H_2 \rightarrow H_2S + 2H_2O \quad (1)$$

$$SO_2 + CO \rightarrow COS + 2CO_2 \quad (2)$$

In general, to provide a hydrogen and carbon monoxide in an amount of 50% in excess over that required to achieve the desired reactions will require the deficiency of air below the theoretical air required for complete oxidation of the carbon, hydrogen and sulfur constituents of about equal to the sulfur content of the fuel. For example, if the fuel contains about 3% sulfur, the amount of air supplied would be about 97% of theoretical air.

While the process is applicable to a wide variety of fuels, it is particularly adapted to the conversion of sulfur bearing fuels of low BTU content, such as those as formed in the gasification of coal. Fuels of this nature generally have a BTU content of about 200-500 BTU per standard cubic foot.

By creating reducing conditions in the combustion zone a portion of the $SO_x$ as $SO_2$ is reduced to $H_2S$ and COS by reactions (1) and (2) above during the production of useful energy in the heat transfer sections of the boiler. The oxides of nitrogen are also reduced to inert nitrogen and ammonia. A major portion of the reduction is carried out catalytically at temperatures from about 300° to about 800° F, preferably from about 500° to about 800° F. Preferably, the catalyst is also capable of converting COS and $CS_2$ to $H_2S$ as well as the oxides of nitrogen to inert nitrogen and/or ammonia. Following this, the formed $H_2S$ is separated from the flue gas stream using absorption processes such as the stretford process which converts the $H_2S$ to sulfur.

With reference now to the FIGURE in power generator 10, boiler 12 is supplied with a sulfur bearing carbonaceous fuel in line 14 which enters along with preheated air from duct 16 in line 18 to combustion section 20.

The sulfur bearing carbonaceous fuel fed to combustion section 20 may be derived from any source such as for instance, a pulverized coal as well as hydrocarbon fluid which may be normally liquid or gaseous in nature. Particularly useful fuels are low BTU gaseous carbonaceous fuels, such as those obtained by the gasification of coal. Fuels of this nature nominally have a heating value of about 200 to about 500 BTU per standard cubic feet.

To achieve essentially complete conversion of the sulfur bearing hydrocarbon contained to yield a reducing gas stream, there is provided sufficient air to maintain stable combustion and above the amount at which significant amounts of free carbon will be formed, but less than that theoretically required to achieve complete oxidation of the carbon, hydrogen and sulfur content of the fuel.

To provide a sufficient driving force to achieve reduction of sulfur dioxide to hydrogen sulfide and carbonyl sulfide the amount of hydrogen and carbon monoxide generated is greater than that stoichiometrically required to reduce all of the sulfur in the fuel taken as sulfur dioxide to hydrogen sulfide and carbonykl sulfide. Preferably the amount of air supplied provides an oxygen deficiency to the extent that the total amount of hydrogen and carbon monoxide formed furing combustion will be from about 30 to about 60% in excess of that required to reduce all of the sulfur values taken as sulfur dioxide to hydrogen sulfide and carbonyl sulfide by the reactions.

In combustion zone 20, there occurs the oxidation of hydrocarbon to form the oxides of carbon and water and the sulfur to the oxides of sulfur normally present as sulfur dioxide. Although some sulfur trioxide will also be formed, the amount being minimal, however, is due to the reduced amount of oxygen available.

Conversion will take place at the temperatures present, normally between about 2000° and 3000° F, normally between 2400° to 2600° F. The prevailing combustion temperature favors the formation of sulfur dioxide as well as carbon monoxide and hydrogen, to exclusion of hydrogen sulfide and carbonyl sulfide formation despite the prevailing reducing conditions. As a result, the flue gas exiting combustion zone 20 will contain sulfur dioxide.

Following combustion zone 20, the flue gas is transported through a radiant boiler section, a convection boiler section, and a high temperature economizer and may be followed by electrostatic precipitator 22 to remove fly ash and any carbon formed. Other means to remove ash and carbon can also be employed. For instance, cyclone, bag filters and the like may also be employed as effluent from these systems is normally sufficiently fine to pass through the catalyst section employed and can be removed in the liquid $H_2S$ absorption systems used in this invention.

The air required for combustion is blown into air preheater 26, and passes by duct 16 through high temperature economizer 24, where it enters the combustion zone through line 18 normally at temperatures from 500° to 600° F.

The combustion products in transferring their heat by convection and radiation to boiler feed water for steam are cooled in boiler 12 from their adiabatic combustion to a temperature from about 300° to about 800°F, preferably from about 500° F to about 800° F.

As gas temperature in boiler 12 reduces, the conditions which favor the reduction of the oxides of sulfur, sulfur dioxide to hydrogen sulfide and carbonyl sulfide occur. As the temperature drops below about 2000° F, for instance, equilibrium begins to favor their formation, with carbonyl sulfide formation being maximized at a temperature of about 1200° F. In addition to the reduction of the oxides of sulfur some of the oxides of nitrogen as well as any hydrogen cyanide present will also be reduced. Because rates of reaction decrease with temperature the flue gases leaving boiler 12 will still contain residual quantities of the oxides of sulfur and nitrogen as well as other sulfur species.

To effectively eliminate them, the gas stream now at a temperature from about 300° to about 800° F is passed through an added catalyst zone 28. Catalyst zone 28 contains one or more metals or their sulfides typically supported on an alumina, silica or alumina-silica which are capable, under reducing conditions, of converting the oxides of sulfur to hydrogen sulfide and the oxides of nitrogen to inert nitrogen and/or ammonia by respective reactions with hydrogen and/or water. Typical of the metals which may be employed are the Group VIII metals such as cobalt, nickel, rhodium, palladium, iridium and platinum, as well as the lower sulfides and oxides of molybdenum and chromium, promoted aluminum oxides and the like.

Besides hydrogenation of the oxides of sulfur to hydrogen sulfide with conversion of the oxides of nitrogen to inert nitrogen and/or ammonia, the water present in the gas stream will simultaneously cause the carbon sulfur compounds such as carbonyl sulfide and carbon disulfide to hydrolyze to hydrogen sulfide. The extent of total conversion of sulfur compounds to hydrogen sulfide in both boiler 12 and catalyst zone 28 is such that the flue gas stream after hydrogen sulfide removal will contain less than about 100 ppm sulfur calculated.

After conversion of the residual noxious sulfur species to hydrogen sulfide and the oxides of nitrogen to inert nitrogen and/or ammonia, the flue gas stream is passed through a low temperature air preheater 26 and to a hydrogen sulfide extraction unit 30.

Because $SO_x$ and $NO_x$ are virtually eliminated from the flue gas, gas temperature can be safely reduced to a temperature of from about 120° to about 150° F in the air preheater 26 without causing corrosive dilute acids such as sulfuric, polythionic, sulfurous and nitric acids to condense in the duct work or contaminate the chemicals used in hydrogen sulfide extraction unit 30.

Any number of methods are feasible for hydrogen sulfide removal with absorption methods being preferred. For instance, the cooled tail gas may be passed through alkaline absorption solutions which are continuously regenerated by oxidation to produce elemental sulfur using catalysts such as sodium vanadate, sodium anthraquinone disulfonate, sodium arsenate, sodium ferrocyanide, iron oxide, iodine and like catalysts.

A convenient alternative is to use absorption solutions containing amines, sulfonates, potassium carbonates and like absorbents for hydrogen sulfide which can be continuously regenerated by steam stripping to produce hydrogen sulfide.

The preferred hydrogen sulfide extraction system is one which involves the alkaline absorption of hydrogen sulfide and oxidation to produce sulfur. The preferred system is known as the "Stretford Process", which employs a solution containing sodium carbonate, sodium vanadate and sodium anthraquinone disulfonic acid as the absorbent used in the absorber. The absorbed hydrogen sulfide is oxidized by sodium vanadate to form sulfur in the absorber and retention tank (not shown), and the absorbing solution is then regenerated by oxidation with air in an oxidizer (not shown). The sulfer is recovered from the solution by conventional means such as flotation, filtration, centrifuging, melting, decantation under pressure and the like.

The stretford Process for stripping hydrogen sulfide from the tail gas is particularly preferred because the flue gas contains carbon dioxide as this component is not extracted. Accordingly, chemical and/or utility requirements are substantially reduced.

After hydrogen sulfide is extracted, the residual flue gas is vented to the atmosphere by stack 32.

In carrying out the process of the invention one of the most material advantages is effect of reduction of sulfur emissions to the atmosphere. Sulfur dioxide emissions can be readily reduced to exceptionally low levels and certainly below 100 ppm which meet or exceeds present regulations for the combustion of sulfur bearing fuels in power generators. This will permit the use of more economical high sulfur fuels for power generation without creating a pollution hazard and while maximizing conversion energy to useful power.

Process of this invention also eliminates the oxides of nitrogen emitted to the atmosphere to exceptionally low and acceptable levels and far lower than any current method for obtaining energy by the combustion of carbpmaceous fuels in power generators.

In addition to permitting recovery of the sulfur contained in the fuel as free sulfur, the sulfur recovery is accomplished without creating a corrosive waste water or solid disposal problem which would only create one environmental problem to replace another.

Another important consideration is that the resultant final volume of flue gas vented to the atmosphere per unit of power generated will be in the order of 10 to 20% less than with conventional combustion practices This permits considerable reduction in both equipment size and capital cost.

EXAMPLE

Pulverized coal containing 3.6% sulfur is burned at the rate of 150 tons per hour. The amount of air used for the combustion is equivalent to 96.5% of the theoretical air required for complete combustion representing an oxygen deficiency of 3.5%. The heat of combustion is extracted by the boiler and generated as steam. The gas stream leaves the boiler at a temperature of 600° to 700° F with some of the heat passing to the air entering the boiler. The gas stream is then passed through a high efficiency electrostatic precipitator to reduce solid particulate content to 0.02 grains per standard cubic feet, then passed through a fixed bed of a cobalt molybdenum catalyst where residual sulfur dioxide is converted to hydrogen sulfide and oxides of nitrogen to a mixture of inert nitrogen and ammonia. The amount of hydrogen and carbon monoxide in the flue gas leaving the catalyst zone is 0.5% by volume, with temperature rise across the catalyst bed being between 10° to 20° F.

The gas stream after being used to supply heat to the incoming air in the preheater is passed to a Stretford unit where the contained hydrogen sulfide is removed prior to venting the gas stream to the atmosphere. Concentration of sulfur dioxide in the bas stream is less than 100 ppm.

What is claimed is:
1. Improved process for the generation of power through the extraction of heat generated from the combustion of sulfur bearing carbonaceous fuels which comprises:
   a. combusting the sulfur bearing carbonaceous fuels in the combustion zone of the boiler maintained at a temperature from about 2000° to about 3000° of a power generator in a deficiency of air to form a reducing flue gas stream of corresponding high temperature comprising carbon dioxide, carbon monoxide, hydrogen, sulfur dioxide, the oxides of nitrogen and water, the hydrogen and carbon monoxide content of the formed high temperature reducing flue gas stream being at least from about 30 to about 60% in excess of the stoichiometric amount required to reduce the formed sulfur dioxide to hydrogen sulfide;
   b. cooling the high temperature reducing flue gas stream in said boiler to a temperature of from about 300° to 800° F, to extract heat values therefrom and thermally reduce a portion of the oxides of nitrogen to a nitrogen compound selected from the group consisting of nitrogen, ammonia and mixtures thereof, and a portion of the sulfur dioxide to a mixture of hydrogen sulfide and carbonyl sulfide;

c. catalytically converting by reduction residual sulfur dioxide to hydrogen sulfide, the oxides of nitrogen to a nitrogen compound selected from the group consisting of nitrogen ammonia and mixtures thereof and hydrolyzing at least part of the carbonyl sulfide to hydrogen sulfide by passing the cooled reducing flue gas stream through a catalytic conversion zone in the presence of a catalyst capable of converting the sulfur dioxide to hydrogen sulfide, the oxides of nitrogen to nitrogen and ammonia and hydrolyzing carbonyl sulfide to hydrogen sulfide; and d. extracting the formed hydrogen sulfide from the flue gas stream and venting the flue gas stream to the atmosphere.

2. A process as claimed in claim 1 in which the cooled reducing flue gas stream is fed to the catalytic conversion zone at a temperature from about 500° to about 800° F.

3. A process as claimed in claim 1 in which the catalyst contains a metal selected from the group consisting of cobalt, nickel, rhodium, palladium, iridium, platinum, molybdenum, chromium and mixtures thereof contained on a support selected from the group consisting of alumina, silica, alumina-silica and mixtures thereof.

4. A process as claimed in claim 1 in which the formed hydrogen sulfide is extracted from the flue gas by contacting the flue gas with a hydrogen sulfide absorption solution.

5. A process as claimed in claim 4 in which the absorbed hydrogen sulfide is oxidized to elemental sulfur using a catalyst selected from the group consisting of sodium vanadate, sodium anthraquinone disulfonate, sodium arsenate, sodium ferrocyanide, iron oxide and iodine.

6. A process as claimed in claim 4 in which the flue gas stream is cooled to a temperature of from about 120° to about 150° F prior to contact with the absorption solution.

* * * * *

UNITED STATES PATENT AND TRADEMARK OFFICE
CERTIFICATE OF CORRECTION

PATENT NO. : 4,039,621
DATED : August 2, 1977
INVENTOR(S) : Ralph Costantini

It is certified that error appears in the above-identified patent and that said Letters Patent are hereby corrected as shown below:

```
     Column 3, line 2, after "about" insert -- 40 --;
line 11, after "SO2 +"  insert -- 3 --.  Column 4,
line 4, after "formed" read -- during --.  Column 5,
line 51, for "sulfer" read -- sulfur --; line 54,
for "stretford" read -- Stretford --.  Column 6,
line 7, for "carbpmaceous" read -- carbonaceous --;
line 43, for "bas" read -- gas --; line 53, after
"3000°" read -- F --.
     Column 4, line 4, delete "furing".
```

Signed and Sealed this

Fourteenth Day of March 1978

[SEAL]

Attest:

RUTH C. MASON
Attesting Officer

LUTRELLE F. PARKER
Acting Commissioner of Patents and Trademarks